(12) United States Patent
Shimabukuro et al.

(10) Patent No.: US 6,377,883 B1
(45) Date of Patent: Apr. 23, 2002

(54) CONTROL APPARATUS FOR HYBRID VEHICLE

(75) Inventors: Eijiro Shimabukuro; Shigeru Aoki; Kazuhiro Ueda; Yusuke Tatara, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/631,387

(22) Filed: Aug. 3, 2000

(51) Int. Cl.$^7$ ................................................ G06F 7/70
(52) U.S. Cl. ........................... 701/51; 701/53; 701/57; 477/3; 477/5; 477/7; 477/13; 477/34; 477/70
(58) Field of Search .............................. 701/51, 53, 57, 701/62, 64; 477/3, 5, 7, 8, 13, 15, 34, 39, 70, 79, 80

(56) References Cited

U.S. PATENT DOCUMENTS

| | | | | |
|---|---|---|---|---|
| 4,382,484 A | * | 5/1983 | Anderson et al. | 180/54.1 |
| 4,387,783 A | * | 6/1983 | Carman | 180/165 |
| 4,441,573 A | * | 4/1984 | Carman et al. | |
| 5,343,970 A | * | 9/1994 | Severinsky | 180/65.2 |
| 5,495,912 A | * | 3/1996 | Gray, Jr. et al. | 180/165 |
| 5,791,427 A | * | 8/1998 | Yamaguchi | 180/65.3 |
| 5,799,744 A | * | 9/1998 | Yamaguchi et al. | 180/65.2 |
| 5,893,895 A | * | 4/1999 | Ibaraki | 701/57 |
| 5,929,608 A | * | 7/1999 | Ibaraki et al. | 322/16 |
| 5,943,918 A | * | 8/1999 | Reed, Jr. et al. | 74/661 |
| 5,979,257 A | * | 11/1999 | Lawrie | 74/335 |
| 5,993,350 A | * | 11/1999 | Lawrie et al. | 477/5 |
| 6,006,620 A | * | 12/1999 | Lawrie et al. | 74/335 |
| 6,019,698 A | * | 2/2000 | Lawrie et al. | 477/5 |
| 6,098,735 A | * | 8/2000 | Sadarangani et al. | 180/65.2 |
| 6,135,914 A | * | 10/2000 | Yamaguchi et al. | 477/3 |
| 6,170,587 B1 | * | 1/2001 | Bullock | 180/69.6 |
| 6,209,672 B1 | * | 4/2001 | Severinsky | 180/65.2 |

FOREIGN PATENT DOCUMENTS

| | | |
|---|---|---|
| JP | 06-38304 | 2/1994 |
| JP | 08028680 A | * 2/1996 |
| JP | 09-224303 | 8/1997 |

OTHER PUBLICATIONS

English abstract–JP 08028680–control device of lock–up clutch–Feb. 2, 1996.*

* cited by examiner

Primary Examiner—William A. Cuchlinski, Jr.
Assistant Examiner—Olga Hernandez
(74) Attorney, Agent, or Firm—Armstrong, Westerman & Hattori, LLP

(57) ABSTRACT

By preventing engagement of an engaging part (clutch) under appropriate conditions, it is possible to effectively avoid the so-called surging phenomenon. When there is an engaging directive for the clutch, the rotational speed of the engaging element positioned at the output shaft side of the drive/regeneration motor (the clutch output rotational speed) is detected, and the gear ratio of the CVT is detected, and when the product of the rotational speed of the engaging element and the gear ratio of the CVT is equal to or below a predetermined value, complete engagement between the engaging elements is prevented, and control is conducted which makes the gear ratio large.

2 Claims, 5 Drawing Sheets

CONTROL APPARATUS FOR HYBRID VEHICLE

BACKGROUND OF THE INVENTION

1. Field of the Invention

The present invention relates to a control apparatus which is applied to hybrid vehicles which are provided with an internal combustion engine, a continuously variable transmission, and an electric motor, where the output shaft of the internal combustion engine is connected to the input side of the continuously variable transmission, the output side of the continuously variable transmission is connected to the output shaft of the electric motor via an engaging part comprising a pair of engaging elements which are freely engageable and disengageable, and the output shaft of the electric motor is connected to a drive force transmission device which is coupled with the drive wheels.

This application is based on Japanese Patent Application No. Hei 11-98210, the contents of which are incorporated herein by reference.

2. Description of the Related Art

The control apparatus described in Japanese Unexamined Patent Application, First Publication, No. Hei 9-224303 which is depicted in FIG. 4, for example, is known as a control apparatus for hybrid vehicles of this type. In FIG. 4, the output shaft of engine 1 drives oil pump 2, and is coupled with the input shaft of the continuously variable transmission 3, while the output shaft of an electric motor 6 is coupled with the output shaft of the continuously variable transmission 3 via a clutch 4 and a gear 5. Furthermore, the drive wheels 8 are coupled with the output shaft of the continuously variable transmission 3 via a differential gear 7.

Furthermore, a rotation sensor (not depicted in the figure) which detects rotational speed is attached to the output shaft of the continuously variable transmission 3, and the output signal from the rotation sensor is input into the input port of an electronic control unit (ECU) 9. Furthermore, the vehicle velocity is ascertained in ECU 9 from the reduction gear ratio of the differential gear 7 and the effective tire radius.

What is depicted in FIGS. 5 and 6 is the order of operation during vehicle running in this control apparatus for hybrid vehicles. By means of this, the control in the hybrid vehicle during start is as described hereinbelow. In other words, when the driver steps on the accelerator pedal, in step S101, the accelerator switch is determined to be ON and control proceeds to step S102. In step S102, if it is determined that the vehicle velocity V is equal to or below 10 km/h, then it is determined that torque cannot be smoothly generated by engine 1, and in step S301, the clutch 4 is opened, and in step S302, the engine 1 is maintained in an idling state, while in step S303, the vehicle runs solely using the torque of the electric motor 6. On the other hand, when it is determined in step S102 that the vehicle velocity V is above 10 km/h, then in step S103, the clutch 4 is placed in the engaged state. In this step S103, the clutch 4 is connected when the rotational speed of the input shaft of the continuously variable transmission 3 and the idling engine speed of engine 1 are in agreement.

By means of this control, during start, when the vehicle velocity V is equal to or below 10 km/h, then engine 1 is placed in an idling state, while when vehicle velocity V is in excess of 10 km/h, the clutch 4 is engaged when the rotational speed of the input shaft of the continuously variable transmission 3 and the idling engine speed of the engine 1 are in agreement. In this case, as shown in FIG. 4, the output shaft of the engine 1 and the input shaft of the continuously variable transmission 3 coincide, so that if the engine 1 is in an idling state, the rotational speed of the input shaft of the continuously variable transmission 3 must be in agreement with the idling engine speed. Accordingly, in such a hybrid vehicle, when the vehicle velocity V exceeds 10 km/h after start, the clutch 4 is connected, and at this point, the engine speed of the engine 1 is the idling engine speed.

However, in the hybrid vehicle described above, when the vehicle velocity is equal to or below a predetermined velocity (10 km/h), clutch 4 remains disengaged; however, when the vehicle velocity is in excess of a fixed value (10 km/h), then the engagement of clutch 4 is conducted while engine 1 is at the idling engine speed. For this reason, in cases when it is necessary to operate with a high engine output after the engagement of clutch 4, because the engine speed is near the idling engine speed, it is impossible to obtain sufficient output, or alternatively, operating with a high output is conducted while maintaining a low engine speed, so that there are large fluctuations in the torque of engine 1, resonance phenomena are induced in the drive system, and there is a possibility that the vehicle will lapse into the so-called "surging" state.

SUMMARY OF THE INVENTION

In view of the above circumstances, the present invention has as an object thereof to provide a control apparatus for hybrid vehicle which makes it possible to effectively avoid the so-called surging phenomenon by preventing the engagement of the engaging part (clutch) under appropriate conditions.

In order to attain the object described above, the following compositions are adopted in the present invention.

That is to say, in a first aspect of the present invention, a control apparatus (for example, control apparatus 11 in the embodiments) applied to hybrid vehicles (for example, hybrid vehicle 10 in the embodiments) which are provided with an internal combustion engine (for example, engine E in the embodiments), a continuously variable transmission (for example, CVT 18 in the embodiments), and an electric motor (for example, drive/regeneration motor M in the embodiments), where an output shaft of the internal combustion engine is connected to an input side of the continuously variable transmission(for example, drive side pulley 19 in the embodiments), and an output side of the continuously variable transmission (for example, driven side pulley 21 in the embodiments) is connected to an output shaft of the electric motor via an engaging part (for example, clutch 28 in the embodiments), comprising a pair of engaging elements (for example, engaging elements 26 and 27 in the embodiments) which are freely engageable and disengageable, and the output shaft of the electric motor is connected to a drive force transmission device (for example, final reduction gear 30 in the embodiments) coupled to the drive wheels; wherein: an engaging element controller (for example, steps S7 and S9 in the embodiments), for controlling engagement and disengagement operations of the engaging elements, a rotational speed detector (for example, step S2 in the embodiments) for detecting the rotational speed of, among the engaging elements, at least that engaging element (for example, engaging element 27 in the embodiments) positioned at the output shaft side of the electric motor, a gear ratio detector (for example, step S3 in the embodiments) for detecting a gear ratio of the continuously variable transmission, and a gear ratio controller (for example, step S8 in the embodiments) for controlling the gear ratio of the continuously variable transmission, are provided. Additionally, control is conducted so that, when the product of the rotational speed of the engaging element positioned at the output shaft side of the electric motor and the gear ratio of the continuously variable transmission is equal to or below a predetermined value (for example, a threshold value in the embodiments (concretely, for example, 1000 rpm)), complete engagement of the engaging elements is prohibited, and the gear ratio is increased.

In the composition described above, when the engaging elements are completely engaged with one another, the product of the rotational speed of the engaging element positioned at the output shaft of the electric motor and the gear ratio of the continuously variable transmission is equal to the engine speed of the internal combustion engine. Here, in the composition described above, when this product is equal to or below a predetermined value, the complete engagement of the engaging elements with one another is prevented, and control is conducted such that the gear ratio of the continuously variable transmission becomes large. Accordingly, when the engaging elements are in a state of engagement with one another, and the engine speed of the internal combustion engine falls undesirably to or below a predetermined value, it is possible to open the engaging part, or to create a half engaged clutch state, to avoid a complete engagement of the engaging elements with one another. By means of this, the state does not result in which the internal combustion engine is connected to the drive system while at a low engine speed and has a high load placed thereon, and thus it is possible to effectively avoid the occurrence of the resonance phenomenon (surging) of the drive system resulting from increases in the fluctuation of the torque of the internal combustion engine. By means of this, it is possible to improve the optimum driving characteristics of the hybrid vehicle.

In a second aspect of the present invention, a required output calculator (for example, step S51 in the embodiments) for calculating output required of the internal combustion engine is provided, and as the calculated output increases in size, the predetermined value is set so as to be increased.

Since this composition is employed, in this hybrid vehicle, as the output required of the internal combustion engine increases, the predetermined value is set so as to be increased, so that as the output required of the internal combustion engine increases, it is not the case that the internal combustion engine is connected to the drive system in a state in which it has a low engine speed, and accordingly, it is possible to reliably avoid the state in which high output driving is conducted while the internal combustion engine has a low engine speed. By means of this, an effect is achieved whereby surging is effectively prevented.

DETAILED DESCRIPTION OF THE PREFERRED EMBODIMENTS

Figure 2:
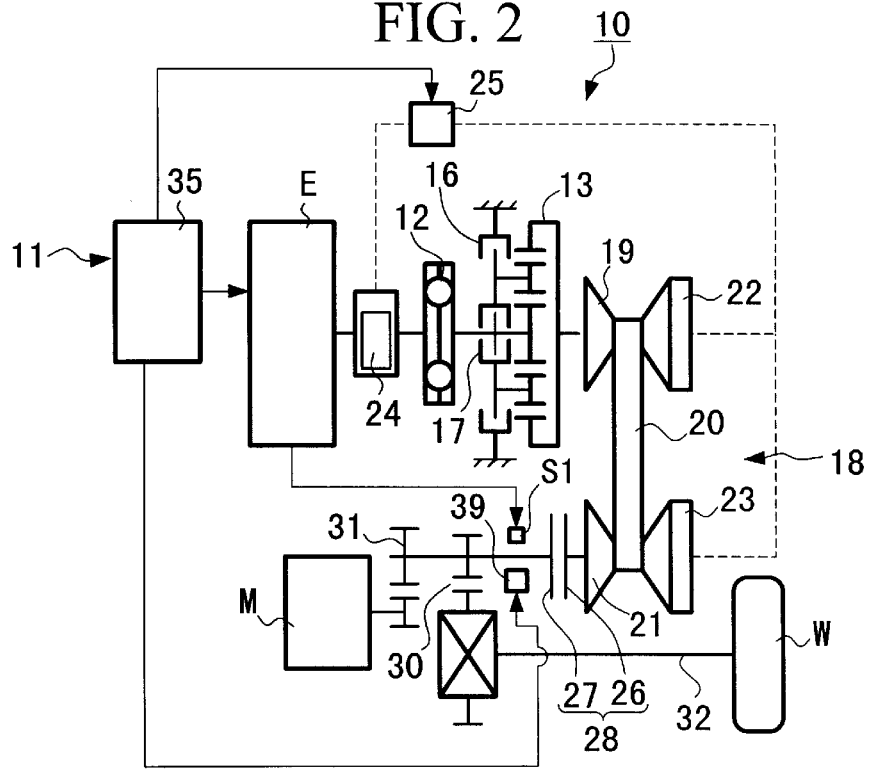
FIG. 2 shows a combination of a schematic diagram of the power transmission system in the hybrid vehicle of the present invention and a block diagram of a control apparatus.

Hereinbelow, embodiments of the present invention will be explained based on the figures. FIG. 2 shows a combination of a schematic diagram of the power transmission system of a hybrid vehicle 10 and a block diagram of the control apparatus 11 which is applied to the hybrid vehicle 10.

In the power transmission system shown in FIG. 2, the power of engine (internal combustion engine) E is input into a planetary gear set 13 for switching between forward and reverse progress via a vibration damper 12. This forward and reverse progress switching planetary gear set 13 may be selectively engaged with hydraulic actuated friction elements 16 and 17 by manipulating a select lever, by means of an oil pressure switching valve (not depicted in the figure) which is mechanically coupled with the select lever, which is not depicted in the figure, and by means of this, it is possible to switch the rotational direction of the power of engine E which is input into the drive side pulley (input side) 19 of the CVT (Continuously Variable Transmission) 18.

Furthermore, the rotation of the drive side pulley 19 is transmitted to the driven side pulley (output side) 21 via a metal belt 20. Here, the gear ratio between the drive side pulley 19 and the driven side pulley 21 is determined by the winding diameter of the metal belt 20 with respect to each pulley, and this winding diameter is controlled by the pressed force generated by oil pressure applied to the side chambers 22 and 23 of each pulley. This oil pressure is generated by an oil pump 24 driven by engine E, and it is supplied to the side chambers 22 and 23 via an oil pressure control apparatus 25.

The driven side pulley 21 is connected to the output shaft of a drive/regeneration motor (electric motor) M via clutch (engaging part) 28 comprising a pair of engaging elements 26 and 27. A final reduction gear (drive force transmitting device) 30 and a gear 31 are interposed between the clutch 28 and the drive/regeneration motor M, and the drive force of the driven side pulley 21 is transmitted to the axle 32 via the final reduction gear 30 and causes the drive wheels W to rotate. Furthermore, the drive force of the drive/regeneration motor M is transmitted to the axle 32 via the gear 31 and the final reduction gear 30, and causes the drive wheels W to rotate.

On the other hand, the control apparatus 11 is provided with an ECU 35 having a microprocessor comprising a CPU (Central Processing Unit), RAM (Random Access Memory), ROM (Read Only Memory) and the like, which are not depicted. The detection results of a clutch rotational speed sensor $S_1$ for detecting the rotational speed of the engaging element 27 connected to the drive/regeneration motor M side are input into ECU 35, and by means of this, it is possible to ascertain the rotational speed at the output side of clutch 28.

Furthermore, ECU 35 is connected with the oil pressure control apparatus 25, and is capable of detecting and controlling the oil pressure supplied to each side chamber 22 and 23 of CVT 18 via the oil pressure control apparatus 25. By means of this, it is possible to ascertain the gear ratio of the CVT 18 in ECU 35, and to control this.

Furthermore, ECU 35 is connected to a clutch control actuator 39 which serves to control the disengagement and engagement of the engaging elements 26 and 27, and is capable of controlling the engaging/disengaging operation of clutch 28.

In hybrid vehicle 10, when the vehicle is stopped, by stopping engine E, it is possible to reduce fuel consumption, and furthermore, when the vehicle is started from this state, the engaging elements 26 and 27 are disengaged and the clutch 28 is placed in an open state, the drive/regeneration motor M is driven, and vehicle start is possible using solely the drive/regeneration motor M. By means of this, when the vehicle is caused to start, it is not necessary to wait for the startup of the engine E, and it is possible to realize a rapid start in accordance with the desires of the driver.

Furthermore, when start is conducted using the drive/regeneration motor M as the drive source, when the driver requires greater drive force, the engine E is started and the clutch 28 is placed in an engaged state, and thereby, the drive force of the engine E is supplied to the axle 32 via CVT 18 and clutch 28, and by means of this, it is possible to respond sufficiently to the desires of the driver.

Figure 1:
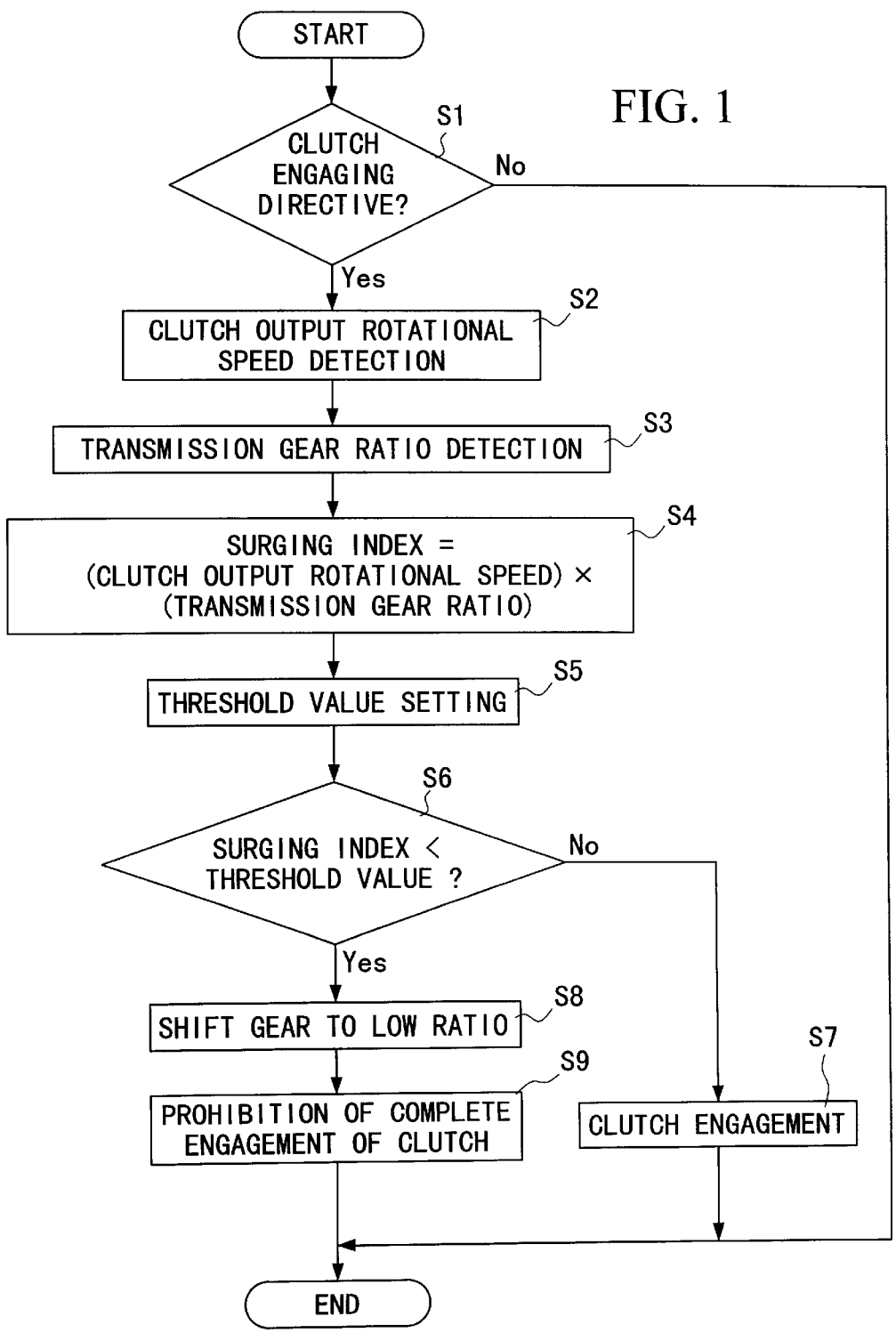
FIG. 1 shows an example of an embodiment of the present invention, and is a flowchart showing the order of control of engagement and disengagement operations between the engaging elements.

In this case, ECU 35 conducts control which engages engaging elements 26 and 27 based on a flowchart such as that shown in FIG. 1.

First, in step S1, the presence of an engaging directive with respect to clutch 28 is determined, and when there is no such directive, this control is bypassed. Furthermore, when there is such a directive, in step S2, the rotational speed of the engaging element 27, that is to say, the output side rotational speed of clutch 28, is detected, and in step S3, the gear ratio of CVT 18 is detected, and in step 4, the product of the output rotational speed of clutch 28 and the gear ratio of CVT 18 is calculated. (Hereinbelow, the value of this product is termed the "surging index.")

Here, the gear ratio of CVT 18 is defined by the following formula:

(Gear ratio)=(rotational speed of drive side pulley 19)/(rotational speed of driven side pulley 21)      (1)

Furthermore, as a result of the composition of hybrid vehicle 10 shown in FIG. 2, the following equations result:

Engine speed of engine E=rotational speed of drive side pulley 19      (2)

Input rotational speed of clutch 28=rotational speed of driven side pulley 21      (3)

Here, the following relationship is obtained from formulae (1)–(3) above:

Gear ratio=(engine speed of engine E)/(input rotational speed of clutch 28)      (4)

Here, if clutch 28 is engaged, the following results:

Output rotational speed of clutch 28=input rotational speed of clutch 28      (5)

From formulas (4) and (5), the following relationship is obtained:

Gear ratio=(engine speed of engine E)/(output rotational speed of clutch 28)      (6)

Modifying this formula, the following is obtained:

Engine speed of engine E=(output rotational speed of clutch 28)×(gear ratio)      (7)

It can be seen from the above observations that the engine speed of engine E when clutch 28 is engaged is equal to the product of the output rotational speed of clutch 28 and the gear ratio of CVT 18, that is to say, is expressed in terms of the surging index.

In step S6 shown in FIG. 1, a determination is made as to whether the surging index is smaller than a predetermined threshold value, and here, as described above, the surging index is a value corresponding to the engine speed of engine E, so that the threshold value is the rotational speed at which engine E falls into a surging state, and concretely, approximately 1000 rpm is adequate, and this is set in step S5.

When the surging index is equal to or above 1000 rpm, then even if clutch 28 is completely engaged, the engine speed does not fall below 1000 rpm, and in step S7, the engagement of engaging elements 26 and 27 is initiated, or in other words, clutch 28 is engaged.

On the other hand, when the surging index is smaller than 1000 rpm, then in step S8, the gear ratio of CVT 18 is shifted so as to be large, that is to say, to the low ratio side, and in step S9, the complete engagement of clutch 28 is prohibited.

In this case, the target gear ratio of CVT 18 is determined as described hereinbelow. In other words, (target gear ratio)≧(surging index)/(clutch output rotational speed)

However, where the target gear ratio is equal to or above the low ratio, the target gear ratio is set equal to the low ratio.

Furthermore, when the complete engagement of clutch 28 is prohibited, concretely, the engaging elements 26 and 27 are completely disengaged, or a half-engaged state (half engaged clutch state), in which the rotational speeds of the engaging elements 26 and 27 differ from one another, is maintained. In this case, the choice as to whether to disengage the engaging elements 26 and 27, or alternatively to maintain the half-engaged state, is made in accordance with the size of the drive force required of the vehicle by the driver. In other words, when the required drive force is comparatively small, the generation of drive force by the engine E is not so pressing, and it is desirable that clutch 28 be in a disengaged state, while when the drive force required is large, it is desirable to generate drive force using the engine E as soon as possible, so that the half-engaged state is desirable. Furthermore, when engaging elements 26 and 27 are in the half-engaged state, the pressed force operating between the engaging elements 26 and 27 is regulated so that the transmitted torque capacity thereof is small in comparison with the product of the torque of engine E and the actual gear ratio of CVT 18. The regulation of the pressed force operating between the engaging elements 26 and 27 is conducted by regulating the oil pressure supplied from oil pump 24 using an oil pressure regulating device not depicted in the figure which operates based on directives from ECU 35.

By means of conducting the control described above, when there is a possibility that surging will occur, it is possible to reliably prevent the engagement of clutch 28, and to shift CVT 18 to the low side, and by means of this, it is possible to avoid, at an earlier stage, a situation in which a high load is placed on engine E while it has a low engine speed, and it is possible to prevent the occurrence of surging.

As described above, the control apparatus 11 of hybrid vehicle 10 conducts control so as to prevent the engagement of engaging elements 26 and 27, and to increase the gear ratio of CVT 18, when the surging index is below a predetermined value (1,000 rpm), so that it is possible to open clutch 28 or to establish a half engaged clutch state in the case in which the engine speed of engine E is less than a predetermined value (1,000 rpm) when the engaging elements 26 and 27 are in an engaged state. By means of this, it is possible to prevent a state in which engine E is connected to the drive system, and a high load is placed thereon, when it is at a low engine speed, and it is possible to effectively prevent the occurrence of a resonance phenomenon (surging) of the drive system which arises as a result of increases in the size of fluctuations in the torque of engine E. By means of this, it is possible to improve the optimum running characteristics of hybrid vehicle 10.

It is also possible to adopt other mechanisms in the embodiment described above insofar as they do not depart from the gist of the present invention.

For example, in the embodiment described above, the threshold value set in step S5 was a fixed value (1000 rpm); however, this may also be made variable.

Figure 3:
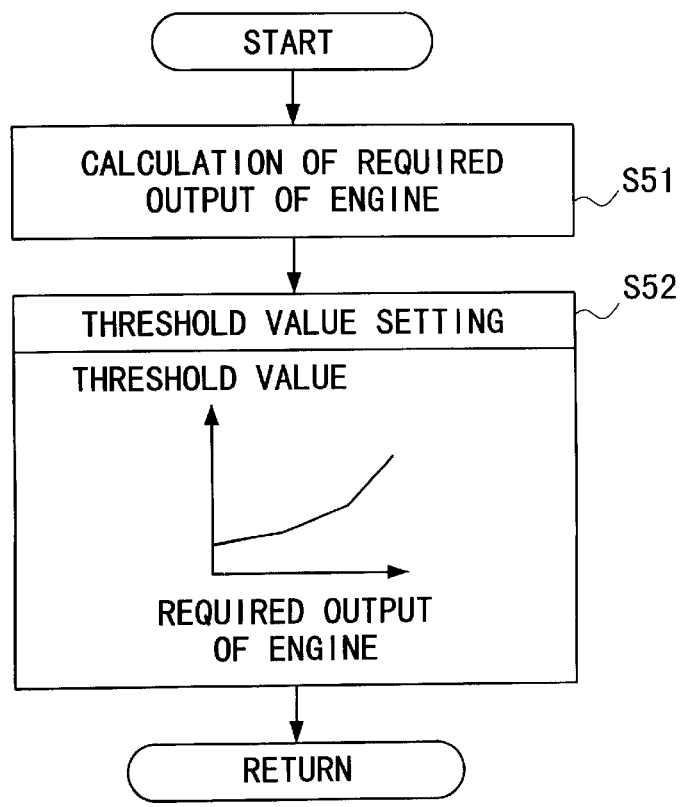
FIG. 3 shows another embodiment of the present invention; it is a flowchart showing the order when setting the threshold value used in the engaging/disengaging control of the engaging elements.
Figure 4:
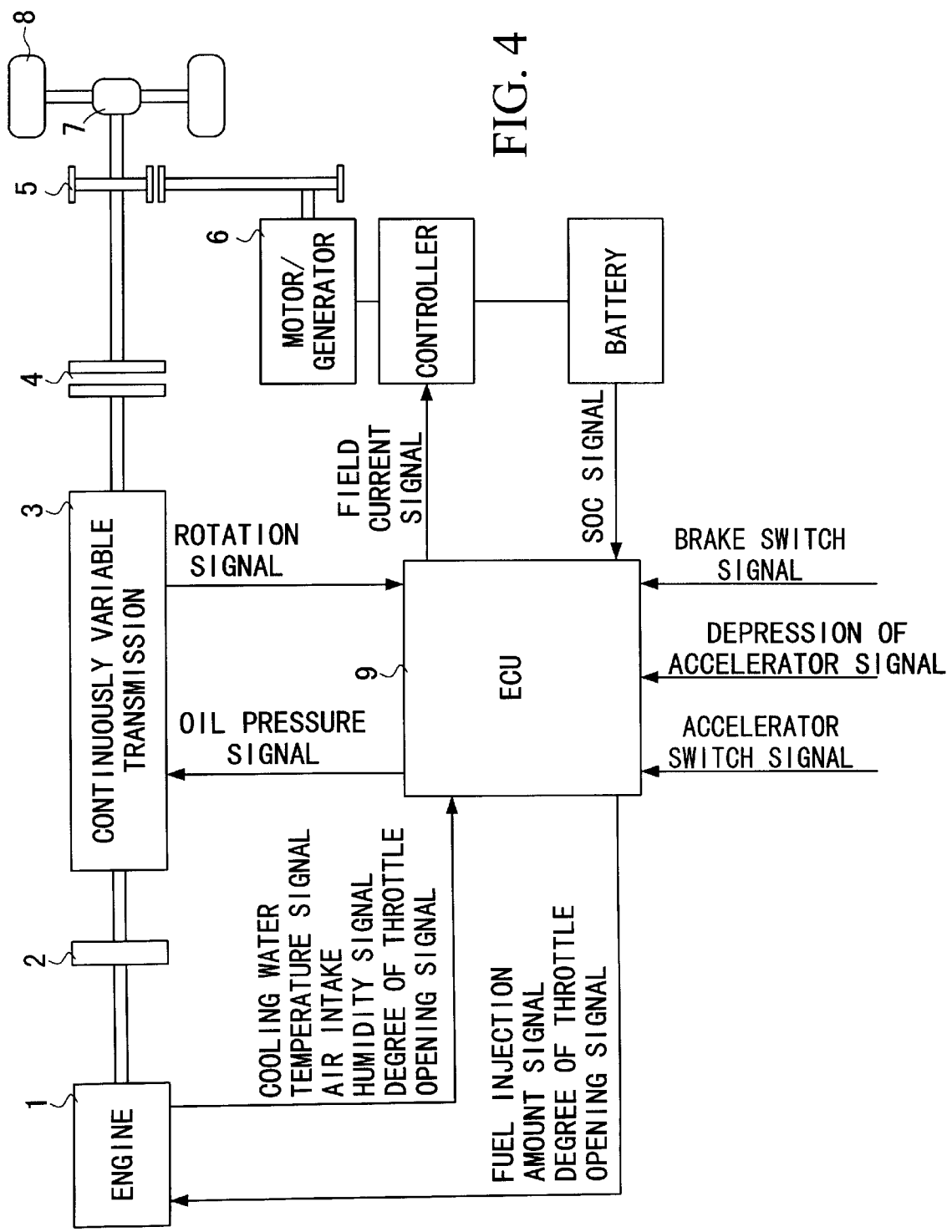
FIG. 4 is a schematic diagram of the power transmission system, and a structural diagram of the control system, of a conventional hybrid vehicle.
Figure 5:
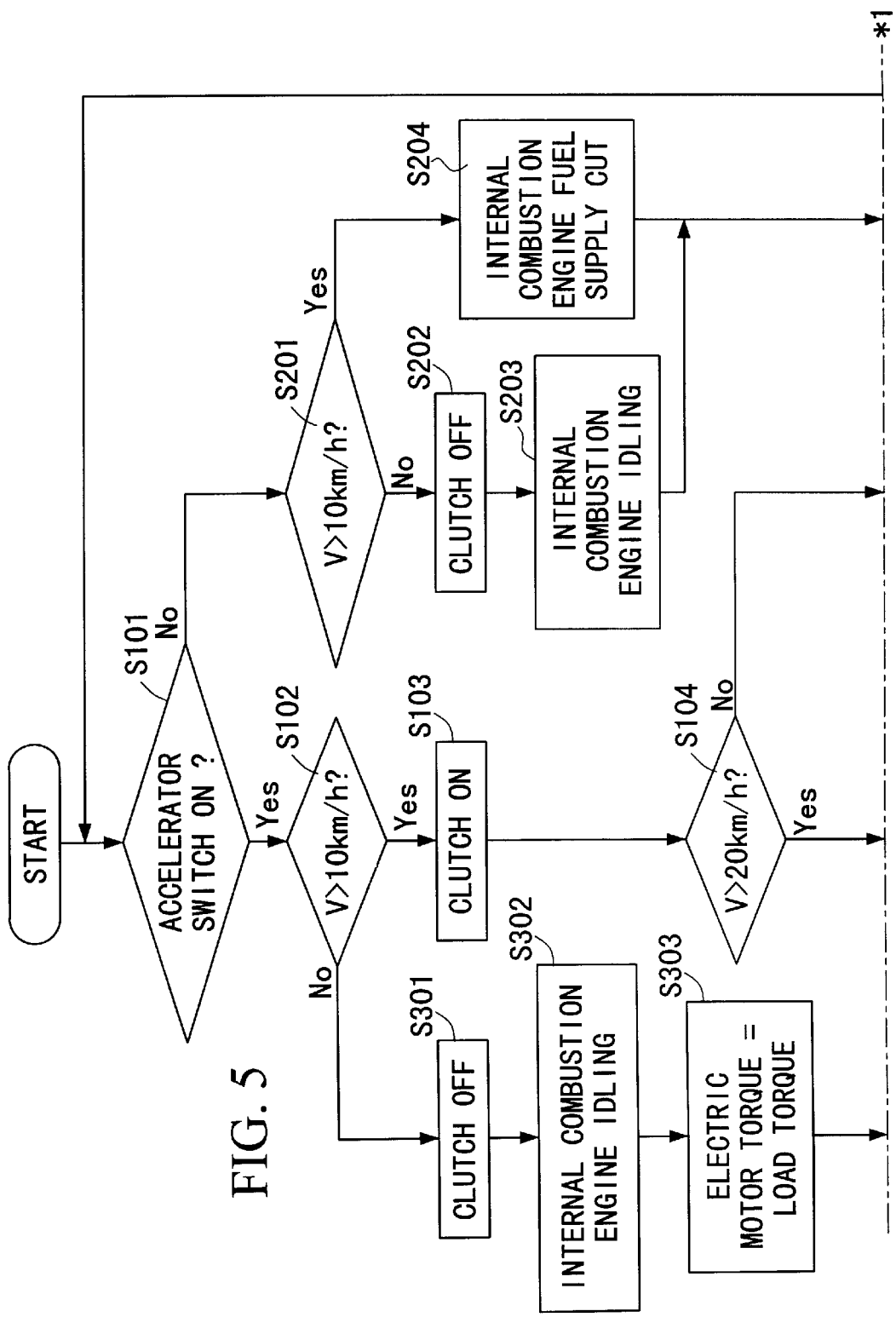
FIG. 5 shows the upper half of a flowchart of the processing carried out in the electronic control apparatus of the hybrid vehicle shown in FIG. 4.
Figure 6:
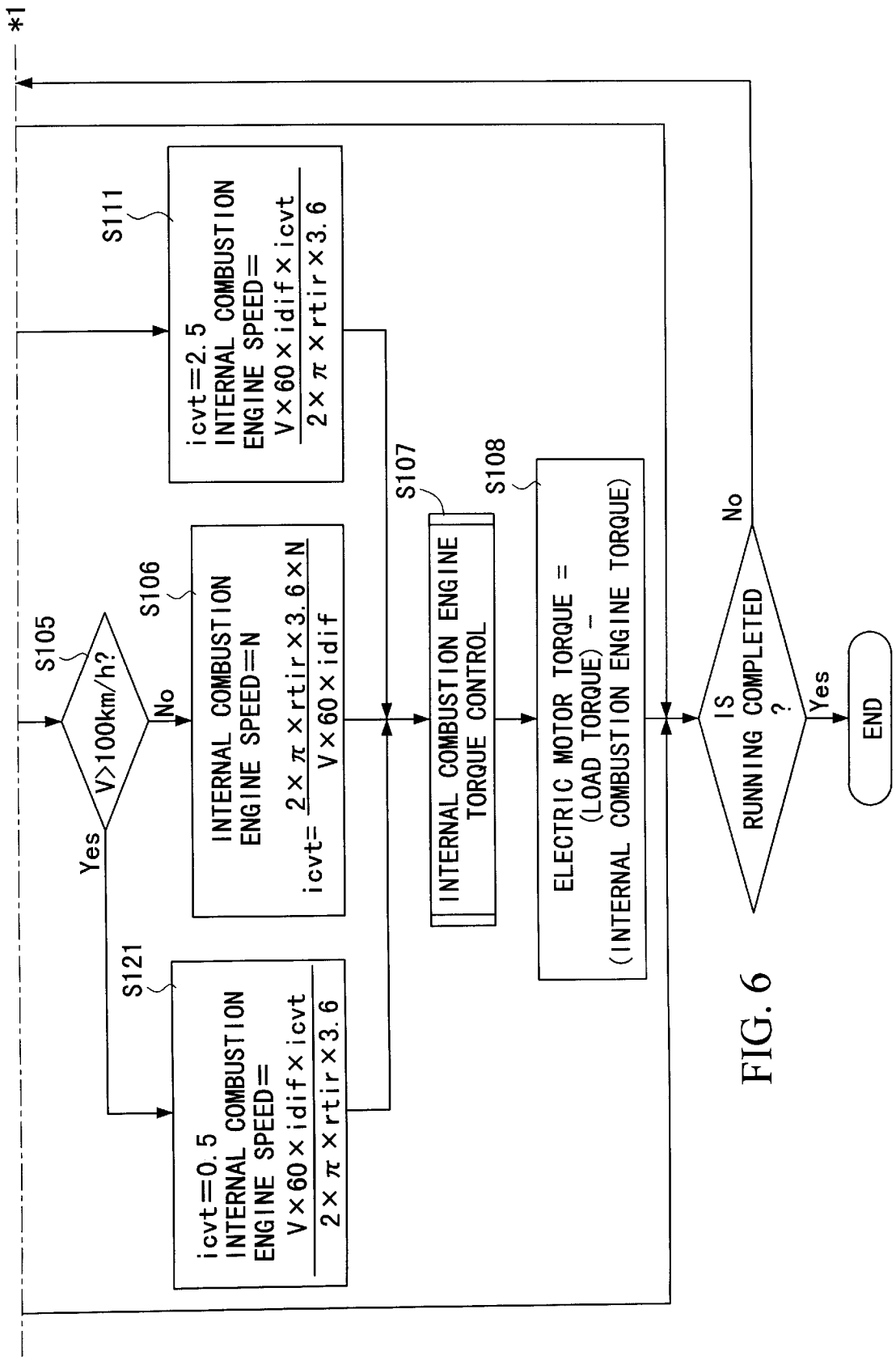
FIG. 6 shows the lower half of the same flowchart.

In this case, the part shown by step S5 in FIG. 1 is preferably replaced with the flowchart shown in FIG. 3. In the flowchart shown in FIG. 3, first, in step S51, the output required in engine E is calculated.

This calculation of the required output of the engine is concretely conducted as described hereinbelow. In other words, first, the output required of the vehicle by the driver is estimated from the depression of accelerator and from the vehicle velocity. Next, a distribution coefficient S ($0 \leq S \leq 1$) is established for distributing this required output from motor M. At first, the distribution coefficient S is set equal to 1, and this value is reduced over time, and finally reaches 0. The required output is distributed to motor M in accordance with the distribution coefficient S, and furthermore, is distributed to engine E in accordance with (1−S). That is to say, this is determined by the following:

Engine required output=(required output with respect to the vehicle)×(1−$S$).

Next, the threshold value corresponding to the engine required output calculated in step S51 is established. The establishment of this threshold value is conducted by setting up a data table in advance, expressed by a graph such as that shown in step S52 in the figure, and basing the threshold value on this data table. The data table has a composition in which the threshold value (vertical axis) increases monotonically in response to increases in the required output of engine E (horizontal axis), and as an example of this, in a vehicle in which the amount of exhaust is 2000 cc or below with a four cylinder engine, the threshold value is set to 1000 rpm when the required output of the engine is 5 kw, while when the required output of the engine is 15 kw, the threshold value is set to 1500 rpm. By adopting this type of composition, as the output required of the engine E increases, engine E is not connected to the drive system in a state in which it is at a low engine speed, and accordingly, it is possible to reliably avoid a state in which high output driving is conducted while engine E has a low engine speed. By means of this, it is possible to effectively prevent surging.

This invention may be embodied in other forms or carried out in other ways without departing from the spirit thereof. The present embodiment is therefore to be considered in all respects illustrative and not limiting, the scope of the invention being indicated by the appended claims, and all modifications falling within the meaning and range of equivalency are intended to be embraced therein.

What is claimed is:

1. A control apparatus applied to hybrid vehicles which are provided with an internal combustion engine, a continuously variable transmission, and an electric motor, where an output shaft of said internal combustion engine is connected to an input side of said continuously variable transmission, and an output side of said continuously variable transmission is connected to an output shaft of said electric motor via an engaging part comprising a pair of engaging elements which are freely engageable and disengageable, and the output shaft of said electric motor is connected to a drive force transmission device coupled to the drive wheels, comprising:

an engaging element controller for controlling engagement and disengagement operations of said engaging elements, a rotational speed detector for detecting the rotational speed of, among said engaging elements, at least that engaging element positioned at the output shaft side of said electric motor, a gear ratio detector for detecting a gear ratio of said continuously variable transmission, and a gear ratio controller for controlling the gear ratio of said continuously variable transmission, wherein control is conducted so that, when the product of the rotational speed of the engaging element positioned at the output shaft side of said electric motor and the gear ratio of said continuously variable transmission is equal to or below a predetermined value, complete engagement of said engaging elements is prohibited, and said gear ratio is increased.

2. A control apparatus for hybrid vehicles in accordance with claim 1, further comprising a required output calculator for calculating output required of said internal combustion engine is provided, wherein as said calculated output increases in size, said predetermined value is set so as to be increased.

* * * * *